H. E. MORRISS.
VULCANIZING APPARATUS.
APPLICATION FILED SEPT. 13, 1921.
1,408,382.
Patented Feb. 28, 1922.
Fig.1.
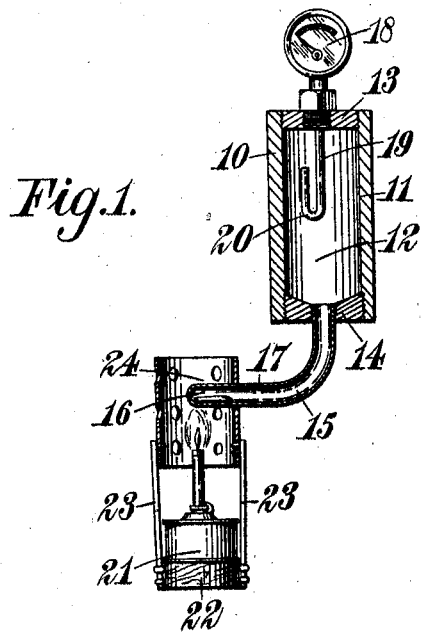
Fig.2.
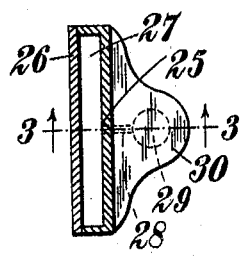
Fig.4.
Fig.3.
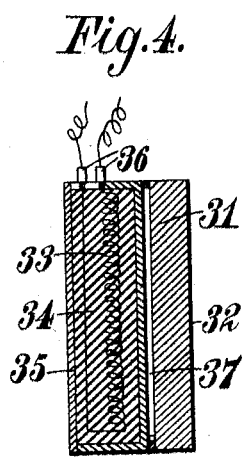
Inventor
Harry E. Morriss
by Wilkinson & Giusta
Attorneys.

UNITED STATES PATENT OFFICE.

HARRY EDWARD MORRISS, OF ENFIELD, ENGLAND, ASSIGNOR TO HARVEY FROST AND COMPANY LIMITED, OF LONDON, ENGLAND.

VULCANIZING APPARATUS.

1,408,382. Specification of Letters Patent. Patented Feb. 28, 1922.

Application filed September 13, 1921. Serial No. 500,282.

*To all whom it may concern:*

Be it known that I, HARRY EDWARD MORRISS, a subject of the King of England, residing at Enfield, Middlesex, in England, have invented certain new and useful Improvements in Vulcanizing Apparatus, of which the following is a specification.

This invention is for improvements in or relating to vulcanizing apparatus, and has for its object to provide an improved construction of heating unit. The unit may be made of any desired size, and though it is particularly suitable for use as a portable unit it may also advantageously be used for heating a large vulcanizing apparatus, the number of units being selected according to the size of the apparatus.

According to this invention, a stem-heating unit for vulcanizing apparatus comprises a steam-and-water container whereto heat can be applied, the container forming a completely closed vessel which contains little or no air, but a quantity of water which shall be sufficient only to fill the vessel with steam at a predetermined temperature appropriate to the operation of vulcanization. In the preferred form of the invention there is provided in vulcanizing apparatus, the combination with a block which is to be heated, of a steam-and-water container formed as a closed shallow vessel in contact with, or bounded on one side by, one face of said block, and preferably co-extensive therewith.

One of the advantages of such a construction is that the use of the steam chamber aforesaid provides for a uniform heating of the face which is required to be heated, and it lessens the risk of the occurrence of "hot spots"; according to another feature of the invention therefore electrically-heated vulcanizing apparatus comprises a heating element, a block to be heated, and a shallow chamber forming a steam-and-water container as above set forth mounted or formed between them.

In the accompanying drawings—

Figure 1 is a sectional view showing a construction of vulcanizing apparatus according to this invention in which a methylated spirit lamp is used as a source of heat;

Figure 2 is a diagrammatic sectional view showing a modified form of the invention, adapted for heating by any desired source of heat, such as a lamp;

Figure 3 is a similar diagrammatic section on the line 3—3 of Figure 2, and

Figure 4 is a diagrammatic view showing an electrically-heated vulcanizing apparatus in section.

Like reference characters indicate like parts throughout the drawings.

Referring first to the construction illustrated in Figure 1, the heating unit comprises a rectangular block of metal 10 whereof one of the faces 11 constitutes the hot surface whereby vulcanization is effected. This block is provided with a central cylindrical bore 12, or a cored hole to receive a plug 13, 14 at each end, these plugs being screwed and soldered, or otherwise permanently secured therein.

The plug 14 at the lower end of the block 10 has secured in it a small tube 15 which communicates at one end with the interior 12 of the block or container aforesaid and is closed at its other end 16. The block or container 10 is, in this particular construction, intended to be used with its longitudinal axis in an upright position, and the tube 15 aforesaid extending downwards therefrom is bent laterally as at 17 so that its closed end 16 lies in a more or less horizontal position.

The plug 13 at the upper end of the block 10 has secured in it a pipe-connection communicating with the interior of the block and adapted to receive a pressure-gauge 18 at its free end. Preferably the communication between the mechanism of the pressure-gauge and the interior of the vessel is effected by a tube 19 of fine bore which extends from the pressure-gauge 18 downwards into the vessel, and is bent up again at 20 in the form of a U.

The interior of the block 10 aforesaid and of the tubular extension 15 thereof constitute a completely closed vessel, and none of the joints in it are intended to be opened by the user of the device.

A small quantity of water is placed in this vessel, and air is excluded therefrom as far as possible. This is conveniently effected by heating some water contained in the vessel until sufficient steam is formed to drive out all the air, letting such air escape through the connection for the pressure-gauge and then screwing up and rendering permanent this connection.

The amount of water that is finally contained in the vessel is selected so that when it is heated up to the required temperature, which in vulcanizing-apparatus is usually measured by the pressure of the steam, the whole of the water, or practically the whole of it has been evaporated.

This quantity of water may be considered as obtained by filling the vessel with saturated steam at the desired pressure, say 80 lbs. per square inch, and then closing the vessel and allowing the said steam to condense.

The heating of the end of the tubular extension aforesaid may be effected by means of any kind of vapor- or gas-lamp, and preferably a suitable wind-shield is secured around the end of the tube which is heated and a regulatable lamp or other source of heat is attached thereto. In the construction illustrated the lamp 21 is provided with an ordinary adjustable wick adapted to burn methylated spirit or paraffin. In order to facilitate the regulation of the flame and heat of this lamp, it is insulated as far as possible to prevent the container for the fuel receiving heat by conduction from the steam- and water-container or the wind-shield attached thereto. This is effected by mounting the said fuel container on a base 22 of wood or other heat-insulating material, and supporting such base on two arms 23 depending from the wind-shield 24. The wind-shield 24 is provided at each end of a diameter, or on opposite sides, with two openings situated vertically one above the other and the said arms 23 have pegs projecting from them and adapted to engage these openings. The said arms are sufficiently resilient to enable them to be sprung apart so that the pegs aforesaid can be brought to register with the openings which they thereupon enter. The lamp-support and the lamp are thereby rigidly secured in the desired position for the flame to play upon the end of the tube 15 which is within the wind-shield.

Any desired form of clamp is provided with the apparatus for securing it in contact with the material to be vulcanized.

The interior of the chamber 12 and the tubular extension 15 thereof are so shaped that all the water contained therein drains down into that end of the tubular extension which is heated by the lamp, and in the operation of this device all that is necessary is to light the lamp. The flame can be made as large as is desired to ensure rapid heating. The water contained in the tube 15 is heated and evaporated so that the whole chamber 12 is filled with steam. The heating continues until this steam attains the desired temperature and pressure, and at this time the whole or practically the whole of the water has been converted into steam. The absorption of heat by the vulcanizing process, and the radiation losses from other parts of the apparatus cause the steam to be condensed and it thereupon flows back into the tube 15 where it is re-evaporated so that a continuous circulation goes on. During this time, however, it is necessary to supply from the lamp only as much heat as is lost or used, as above-described, and the lamp should therefore be turned down so as not to cause any undesired increase in the temperature of the steam. It is for this reason that the lamp is so constructed as to be easily regulatable.

It will be seen that since a very small quantity of water is used, the desired temperature and pressure can be attained much more rapidly than is ordinarily the case in vulcanizing apparatus. Moreover, although the whole device is a completely closed vessel, the quantity of water is so small that no serious result would ensue should there be any failure in operation of the device. In the case of the heating by the lamp being continued at too high a rate, the conversion of the whole of the water into steam ensures that the pressure will thereafter rise much more slowly than the temperature, so that the ultimate result will be that a soldered joint will fail owing to the increase in temperature before the pressure has attained a dangerous limit. The failure of this joint permits the steam to escape and this quantity is so small that it is not serious.

In the modified construction illustrated in Figures 2 and 3, the apparatus comprises a shallow flat vessel 25, having a plate 26 forming a closure of its open side. This plate 26 constitutes the hot surface whereby vulcanization is effected. The interior 27 of the vessel 25 is in communication by a suitable channel 28 with a chamber 29 formed in a laterally-extending portion 30 of the vessel 25. The chambers 27, 29, and communicating passage 28 form an entirely closed vessel, and there is inserted therein a small quantity of water as described with reference to Figure 1. Heat is applied in any desired manner to the portion 30 to vaporize the water so that the plate 26 is heated by the steam thus generated. The shallow formation of this chamber 27 enables the total volume to be kept small, so that the quantity of water is kept correspondingly small and rapid vaporization is thereby ensured.

The use and operation of this device are exactly similar to that described with reference to the construction described in Figure 1 and need not be repeated.

Figure 4 illustrates diagrammatically a construction of electrically-heated vulcanizer. A block of metal 31, which may be of any desired thickness, is used to provide the hot surface 32 whereby vulcanization is effected. The heating element is indicated at 33, this being constituted by a suitable resistance embedded in an insulating material 34 and mounted in a suitable casing 35. The terminal plugs are also indicated diagrammatically at 36. Instead of securing the block or plate 31 directly on to the casing 35, as is ordinarily done with electrically-heated vulcanizers, there is interposed between them a chamber 37. This may be constituted by a separate shallow vessel or envelope, or the chamber may be constituted by recesses in one or other of the parts 31, 35. A quantity of water is placed in the chamber 37, which is then hermetically sealed. The heat which is generated in the heating-element 33 is transmitted to the block 31, (apart from conduction along the side walls), only by the steam which is formed in the chamber 37. This ensures that the heat is uniformly distributed over the block 31 and one of the principal disadvantages of electric heaters, the occurrence of hot spots, is thereby avoided. The quantity of water in the chamber 37 is limited as above described so as to be sufficient only to fill the vessel with steam at the temperature appropriate to vulcanization.

It will be understood that this invention is not restricted to any specific details of constructions, as these may obviously be modified to a very great extent; it also lies within the scope of this invention, to use the steam-heating-unit hereinbefore described in groups for large vulcanizing apparatus. The particular shaping of the steam chamber and of the hot surface which is to be used may also be varied according to the requirements of the work. These and other modifications are all held to lie within the scope of the present invention.

What I claim as my invention and desire to secure by Letters Patent is:—

1. In vulcanizing apparatus, a steam-heating unit comprising a steam-and-water container whereto heat can be applied, forming a completely closed vessel which contains little or no air, but a quantity of water which shall be sufficient only to fill the vessel with steam at a pre-determined temperature appropriate to the operation of vulcanization.

2. In vulcanizing apparatus according to claim 1, the combination with a block which is to be heated, of a steam-and-water container formed as a closed shallow vessel in contact with, or bounded on one side by one face of said block, and preferably co-extensive therewith.

3. Electrically-heated vulcanizing apparatus comprising a heating element, a block to be heated and a shallow chamber forming a steam-and-water container as set forth in claim 1, mounted or formed between them.

4. In vulcanizing apparatus, the combination of a block which is to be heated, a heating unit spaced away from one surface thereof to provide a shallow chamber between them, and walls closing the edges of said chamber, said chamber containing only such a quantity of water as will be sufficient to fill the chamber with steam at a predetermined temperature appropriate to the operation of vulcanization.

In testimony whereof I affix my signature.

HARRY EDWARD MORRISS.